United States Patent [19]

Ballance et al.

[11] Patent Number: 5,320,868

[45] Date of Patent: Jun. 14, 1994

[54] METHOD OF FORMING SI-O CONTAINING COATINGS

[75] Inventors: David S. Ballance; Keith W. Michael, both of Midland, Mich.

[73] Assignee: Dow Corning Corporation, Midland, Mich.

[21] Appl. No.: 119,634

[22] Filed: Sep. 13, 1993

[51] Int. Cl.⁵ ............................................. B05D 3/02
[52] U.S. Cl. ................................... 427/228; 427/387; 427/226; 428/688
[58] Field of Search .................. 427/226, 228, 387; 428/688

[56] References Cited

U.S. PATENT DOCUMENTS

| | | | |
|---|---|---|---|
| 4,749,631 | 6/1988 | Halusta et al. | 427/228 X |
| 4,756,977 | 7/1988 | Haluska et al. | 428/704 |
| 4,911,992 | 3/1990 | Halusta et al. | 427/228 X |

FOREIGN PATENT DOCUMENTS 903110088  5/1991  European Pat. Off. .

*Primary Examiner*—Michael Lusignan
*Attorney, Agent, or Firm*—Roger E. Gobrogge

[57] ABSTRACT

Disclosed is a method for forming improved Si—O containing coatings on electronic substrate. The method comprises converting hydrogen silsesquioxane resin into a Si—O containing ceramic coating in the presence of hydrogen gas. The resultant coatings have improved properties such as stable dielectric constants.

10 Claims, No Drawings

METHOD OF FORMING SI-O CONTAINING COATINGS

BACKGROUND

The present invention relates to a method of forming novel Si—O containing coatings. The method comprises converting hydrogen silsesquioxane resin into Si—O containing ceramic coatings in the presence of hydrogen gas. The resultant coatings have desirable properties.

The use of silica-containing ceramic coatings derived from hydrogen silsesquioxane resin on electronic devices is known in the art. For instance, Haluska et al. in U.S. Pat. No. 4,756,977 describe processes for forming coatings on electronic devices which comprise diluting hydrogen silsesquioxane in solvents, applying the solutions to substrates, evaporating the solvents and heating the coated substrates to a temperature of about 150° to about 1000° C. in air. This patent, however, does not describe the use of hydrogen gas in the conversion of hydrogen silsesquioxane resin into the silica containing ceramic.

The conversion of hydrogen silsesquioxane resin to a Si—O containing ceramic in other environments is also known in the art. For instance, European Patent Application No. 90311008.8 teaches the conversion of hydrogen silsesquioxane resin to a Si—O containing ceramic by heating a substrate coated with the resin in an inert gas atmosphere. This patent too, however, does not describe the use of hydrogen gas in the pyrolysis atmosphere curing conversion of hydrogen silsesquioxane resin into the silica containing ceramic.

The present inventors have now discovered that hydrogen silsesquioxane resin can be converted into Si—O containing ceramic coatings with improved properties by heating in an environment containing hydrogen gas.

SUMMARY OF THE INVENTION

The present invention relates to a method of forming a Si—O containing ceramic coating on an electronic substrate. The method comprises first applying a coating comprising hydrogen silsesquioxane resin on the substrate. The coated substrate is then heated in an atmosphere containing hydrogen gas at a temperature sufficient to convert the hydrogen silsesquioxane resin coating to a Si—O containing ceramic coating.

DETAILED DESCRIPTION OF THE INVENTION

The present invention is based on the discovery that heating hydrogen silsesquioxane resin in an atmosphere comprising hydrogen gas converts the resin to an Si—O containing ceramic coating with properties superior to those achieved by heating the resin in conventional gaseous atmospheres. For instance, the use of hydrogen can lower the dielectric constant of the resultant ceramic coating and render it stable. Moreover, such treatment may also advantageously affect the physical properties of the coating (eg., stress, cracking, etc.).

Because of these effects, the coatings resulting from this invention are particularly valuable on electronic substrates. Such coatings could serve, for example, as protective coatings, interlevel dielectric layers, doped dielectric layers to produce transistor like devices, pigment loaded binder systems containing silicon to produce capacitor and capacitor like devices, multilayer devices, 3-D devices, silicon on insulator devices, coatings for superconductors, super lattice devices and the like.

As used in the present invention, the expression "ceramic" is used to describe the hard, Si—O containing coatings obtained after heating hydrogen silsesquioxane resin in hydrogen. These coatings may contain both silica ($SiO_2$) materials as well as silica-like materials (eg., $SiO$, $Si_2O_3$, etc.) which are not fully free of residual carbon, silanol (Si—OH) and/or hydrogen. The coatings may also be doped with boron or phosphorous. The expression "electronic substrate" is meant to include, but is not limited to, electronic devices or electronic circuits such as silicon based devices, gallium arsenide based devices, focal plane arrays, opto-electronic devices, photovoltaic cells and optical devices.

According to the process of the invention, a coating comprising hydrogen silsesquioxane resin is first applied on an electronic substrate. The hydrogen silsesquioxane resins (H-resin) which may be used in this process include hydridosiloxane resins of the formula $HSi(OH)_x(OR)_yO_{z/2}$, in which each R is independently an organic group or a substituted organic group which, when bonded to silicon through the oxygen atom, forms a hydrolyzable substituent, $x=0-2$, $y=0-2$, $z=1-3$, $x+y+z=3$. Examples of R include alkyls such as methyl, ethyl, propyl, butyl, etc., aryls such as phenyl, and alkenyls such as allyl or vinyl. These resins may be fully condensed $(HSiO_{3/2})_n$ or they may be only partially hydrolyzed (i.e., containing some Si—OR) and/or partially condensed (i.e., containing some Si—OH). Although not represented by this structure, these resins may also contain a small number (eg., less than about 10%) of silicon atoms which have either 0 or 2 hydrogen atoms attached thereto or a small number of SiC bonds due to various factors involved in their formation or handling. Moreover, these resins may be doped with boron or phosphorous as desired.

The above H-resins and methods for their production are known in the art. For example, Collins et al. in U.S. Pat. No. 3,615,272, which is incorporated herein by reference, teach the production of a nearly fully condensed H-resin (which may contain up to 100-300 ppm silanol) by a process comprising hydrolyzing trichlorosilane in a benzenesulfonic acid hydrate hydrolysis medium and then washing the resultant resin with water or aqueous sulfuric acid. Similarly, Bank et al. in U.S. Pat. No. 5,010,159, which is hereby incorporated by reference, teach an alternative method comprising hydrolyzing hydridosilanes in an arylsulfonic acid hydrate hydrolysis medium to form a resin which is then contacted with a neutralizing agent.

Other hydridosiloxane resins, such as those described by Frye et al. in U.S. Pat. No. 4,999,397, hereby incorporated by reference, those produced by hydrolyzing an alkoxy or acyloxy silane in an acidic, alcoholic hydrolysis medium, those described in Kokai Patent Nos. 59-178749, 60-86017 and 63-107122, or any other equivalent hydridosiloxane, will also function herein.

It is to be noted that in a preferred embodiment of the invention, specific molecular weight fractions of the above H-resins may also be used in this process. Such fractions and methods for their preparation are taught by Hanneman et al. in U.S. Pat. No. 5,063,267 which is hereby incorporated by reference. A preferred fraction comprises material wherein at least 75% of the polymeric species have a molecular weight above about 1200 and a more preferred fraction comprises material wherein at least 75% of the polymeric species have a molecular weight between about 1200 and about 100,000.

The hydrogen silsesquioxane resin coating material may also contain other ceramic oxide precursors. Examples of such ceramic oxide precursors include compounds of various metals such as aluminum, titanium, zirconium, tantalum, niobium and/or vanadium as well as various non-metallic compounds such as those of boron or phosphorous which may be dissolved in solution, hydrolyzed, and subsequently pyrolyzed, at relatively low temperatures and relatively rapid reaction rates to form ceramic oxide coatings.

The above ceramic oxide precursor compounds generally have one or more hydrolyzable groups bonded to the above metal or non-metal, depending on the valence of the metal. The number of hydrolyzable groups to be included in these compounds is not critical as long as the compound is soluble in the solvent. Likewise, selection of the exact hydrolyzable substituent is not critical since the substituents are either hydrolyzed or pyrolyzed out of the system. Typical hydrolyzable groups include, but are not limited to, alkoxy, such as methoxy, propoxy, butoxy and hexoxy, acyloxy, such as acetoxy, or other organic groups bonded to said metal or non-metal through an oxygen such as acetylacetonate. Specific compounds, therefore, include zirconium tetracetylacetonate, titanium dibutoxy diacetylacetonate, aluminum triacetylacetonate, tetraisobutoxy titanium, $B_3(OCH_3)_3O_3$ and $P_3(OCH_2CH_3)_3O$.

When hydrogen silsesquioxane resin is to be combined with one of the above ceramic oxide precursors, generally it is used in an amount such that the final ceramic coating contains 70 to 99.9 percent by weight $SiO_2$.

The hydrogen silsesquioxane resin coating material may also contain a platinum, rhodium or copper catalyst to increase the rate and extent of conversion to silica. Generally, any platinum, rhodium or copper compound or complex which can be solubilized will be functional. For instance, a composition such as platinum acetylacetonate, rhodium catalyst $RhCl_3[S(CH_2CH_2CH_2CH_3)_2]_3$, obtained from Dow Corning Corporation, Midland, Mich., or cupric naphthenate are all within the scope of this invention. These catalysts are generally added in an amount of between about 5 to 1000 ppm platinum, rhodium or copper based on the weight of hydrogen silsesquioxane resin.

The H-resin is coated on the desired substrate by any practical means but a preferred approach uses a solution comprising the H-resin in a suitable solvent. If this solution approach is used, the solution is generally formed by simply dissolving or suspending the H-resin in a solvent or mixture of solvents. Various facilitating measures such as stirring and/or heat may be used to assist in the dissolution. The solvents which may be used in this method include, for example, alcohols such as ethyl or isopropyl, aromatic hydrocarbons such as benzene or toluene, alkanes such as n-heptane or dodecane, ketones, cyclic dimethylpolysiloxanes, esters or glycol ethers, in an amount sufficient to dissolve the above materials to low solids. For instance, enough of the above solvent can be included to form a 0.1–50 weight percent solution.

The above H-resin solution is then applied to the substrate. Means such as spin, spray, dip or flow coating will all function herein. Following application, the solvent is allowed to evaporate by means such as simple air drying by exposure to an ambient environment or by the application of a vacuum or mild heat.

Although the above described methods primarily focus on using a solution approach, one skilled in the art would recognize that other equivalent means of coating (eg., melt coating) would also function herein and are contemplated to be within the scope of this invention.

The coated electronic substrate is then heated in a pyrolysis atmosphere comprising hydrogen gas at a temperature sufficient to convert the hydrogen silsesquioxane resin to an Si—O containing ceramic coating. The hydrogen gas may be present in this atmosphere during the entire pyrolysis or, alternatively, the hydrogen gas can be present during only a portion of the conversion.

The atmosphere used for converting the hydrogen silsesquioxane resin can contain nearly any concentration of hydrogen gas practical. For example, concentrations in the range of between about 0.01 and 100 volume percent can be used. Obviously, however, the upper limit of the concentration will be determined by the method of use due to the explosive nature of hydrogen. Generally, preferred concentrations are in the range of about 1 to about 30 volume percent. If the hydrogen gas is to be in contact with air, generally concentrations of 5 volume percent or lower are used.

The diluent gas for the hydrogen is likewise not critical. Inert gases such a nitrogen, argon, helium, etc. or reactive gases such as air, $O_2$, oxygen plasma, ozone, ammonia, amines, moisture, $N_2O$, etc. may all be used. As noted above however, if a reactive gas is used, the concentration of hydrogen must be carefully monitored to prevent explosions.

The temperature used for heating is generally in the range of about 50° to about 1000° C. The exact temperature, however, will depend on factors such as the pyrolysis atmosphere, heating time and the desired coating. Preferred temperatures are often in the range of about 200° to about 600° C.

Heating is generally conducted for a time sufficient to form the desired Si—O containing ceramic coating. Generally, the heating time is in the range of up to about 6 hours. Heating times of less than about 2 hours (eg., 0.1–2 hrs) are generally preferred.

The above heating may be conducted at any effective atmospheric pressure from vacuum to superatmospheric pressure. Any method of heating such as the use of a convection oven, rapid thermal processing, hot plate, or radiant or microwave energy is generally functional herein. The rate of heating, moreover, is also not critical, but it is most practical and preferred to heat as rapidly as possible.

The following non-limiting example is included so that one skilled in the art may more readily understand the invention.

EXAMPLE 1

Hydrogen silsesquioxane resin (made by the method of Collins et al. in U.S. Pat. No. 3,615,272) was diluted to 22 wt. % in methylisobutylketone. A 4 inch diameter 1 mOhm-cm, n-type, silicon wafer was coated with this solution by spinning at 1500 RPM for 10 seconds. The coated wafer was then converted to the Si—O containing ceramic by heating at 400° C. for 1 hour in an atmosphere containing 5 volume percent hydrogen in nitrogen at atmospheric pressure. The resultant coating was about 0.8 microns thick. The dielectric constant was 4.4 and remained constant on exposure to the laboratory environment.

That which is claimed is:

1. A method of forming an Si—O containing ceramic coating on an electronic substrate comprising:
    applying a coating comprising hydrogen silsesquioxane resin on an electronic substrate; and
    heating the coated substrate in a pyrolysis atmosphere at a temperature sufficient to convert the hydrogen silsesquioxane resin coating to an Si—O containing ceramic coating wherein hydrogen gas is introduced into the pyrolysis atmosphere during conversion of the hydrogen silsesquioxane resin to the Si—O containing ceramic coating.

2. The method of claim 1 wherein the hydrogen silsesquioxane resin is applied to the substrate by a process which comprises coating the substrate with a solution comprising a solvent and the hydrogen silsesquioxane resin and then evaporating the solvent.

3. The method of claim 1 wherein the coated substrate is heated at a temperature in the range of between about 50° C. and about 1000° C. for less than about 6 hours.

4. The method of claim 1 wherein the hydrogen silsesquioxane resin contains polymeric species such that at least 75% of the polymeric species have a molecular weight between about 1200 and about 100,000.

5. The method of claim 1 wherein the hydrogen silsesquioxane resin containing coating also contains modifying ceramic oxide precursors comprising a compound containing an element selected from the group consisting of titanium, zirconium, aluminum, tantalum, vanadium, niobium, boron and phosphorous wherein the compound contains at least one hydrolyzable substituent selected from the group consisting of alkoxy or acyloxy and the compound is present in an amount such that the silica coating contains 0.1 to 30 percent by weight modifying ceramic oxide.

6. The method of claim 1 wherein the hydrogen silsesquioxane resin containing coating also contains a platinum, rhodium or copper catalyst in an amount of between about 5 and about 1000 ppm platinum, rhodium or copper based on the weight of hydrogen silsesquioxane resin.

7. The method of claim 1 wherein the pyrolysis atmosphere also contains a gas selected from the group consisting of air, $O_2$, oxygen plasma, ozone, an inert gas, ammonia, amines, moisture, and $N_2O$.

8. The method of claim 1 wherein the hydrogen gas in the pyrolysis atmosphere is in a concentration in the range of about 1 to about 30 volume percent.

9. The method of claim 1 wherein the hydrogen gas in the pyrolysis atmosphere is in a concentration of less than or equal to about 5 volume percent.

10. In a method of forming an Si—O containing ceramic coating on an electronic substrate comprising applying a coating comprising hydrogen silsesquioxane resin on an electronic substrate and heating the coated substrate in a pyrolysis atmosphere at a temperature sufficient to convert the hydrogen silsesquioxane resin coating to an Si—O containing ceramic coating, the improvement comprises:
    introducing hydrogen gas into the pyrolysis atmosphere during conversion of the hydrogen silsesquioxane resin to the Si—O containing ceramic coating.

* * * * *